United States Patent [19]

Norris

[11] Patent Number: 5,280,524
[45] Date of Patent: Jan. 18, 1994

[54] BONE CONDUCTIVE EAR MICROPHONE AND METHOD

[75] Inventor: Elwood G. Norris, Poway, Calif.

[73] Assignee: Jabra Corporation, San Diego, Calif.

[21] Appl. No.: 881,425

[22] Filed: May 11, 1992

[51] Int. Cl.$^5$ .............................................. H04M 1/05
[52] U.S. Cl. .................................... 379/387; 379/430; 379/388; 379/420; 381/187; 381/163
[58] Field of Search ............... 379/430, 78, 85, 444, 379/388, 420, 387; 381/163, 169, 187

[56] References Cited

U.S. PATENT DOCUMENTS

| | | | |
|---|---|---|---|
| 3,087,028 | 4/1963 | Bonnin | 379/430 |
| 3,869,584 | 3/1975 | Wilde | 379/430 |
| 4,087,653 | 5/1978 | Frieder, Jr. et al. | 379/430 |
| 4,588,867 | 5/1986 | Konomi | 379/430 |
| 4,862,509 | 8/1989 | Towsend | 381/163 |
| 4,930,156 | 5/1990 | Norris | 379/388 |
| 4,972,468 | 11/1990 | Murase et al. | 379/430 |
| 4,972,491 | 11/1990 | Wilcox, Jr. | 379/430 X |
| 5,054,079 | 10/1991 | Frielingsdorf et al. | 379/430 X |
| 5,099,519 | 3/1992 | Guan | 379/430 X |
| 5,109,410 | 4/1992 | Suhami et al. | 379/430 |

FOREIGN PATENT DOCUMENTS 0066293  4/1984  Japan ................... 379/430

Primary Examiner—Curtis Kuntz
Assistant Examiner—M. Shehata
Attorney, Agent, or Firm—Thorpe, North & Western

[57] ABSTRACT

An ear piece device configured for being supported in the ear and providing a microphone which is sensitive only to sounds conducted within the skull of the user is contained within a housing which is configured at one end to fit snugly at the ear canal of the user, but not to extend within the ear canal. A microphone element is coupled within the housing in a position such that the microphone element is separated from contact with the skull of the user by the housing. This microphone element includes an inertial platform which has sufficient inertial mass to substantially resist movement associated with the housing by reason of audio vibration and which is cantilevered at one end within the housing and includes signal means for generating a signal representing vibrations transferred into the housing in the form of audio vibrations from the user. This signal is supplied to an audio circuit for processing and reproduction of the user's voice. A speaker element may be included within the ear device and can be decoupled acoustically so as to avoid feedback. This system can operate with full duplex and enable hands free communication and direct voice command by user through computer modems, telephone networks and other communication systems.

38 Claims, 4 Drawing Sheets

BONE CONDUCTIVE EAR MICROPHONE AND METHOD

BACKGROUND OF THE INVENTION

1. Field of the Invention

This invention pertains to a microphone which picks up speech vibrations through the bone structure of an individual's skull and develops a signal for audio processing. More particularly, the present invention relates to an ear mounted microphone responsive to audio vibrations from the user's skull which are isolated from surrounding background environment and which can be used in duplex with a speaker positioned within a common housing with the microphone.

2. Prior Art

The emergence of computer based control systems for virtually every aspect of daily living has re-emphasized the need for an inexpensive system for providing direct voice command capability. At present, most computer systems rely on keyboard input to provide data and processing instructions. This is not only time consuming and limiting in view of physical requirements of being seated with both hands on a key pad, but it limits the efficiency of data input to the typing speed of the user. Indeed, compared with the advanced degree of sophistication of current computer systems, this dominant data entry method of imputing instructions one letter or number at a time seems almost archaic.

This is not to say that the development of voice activated input systems has been ignored. There has clearly been a long recognized need for implementation of a method of voice command which would obviate the keyboard as a computer input device. Numerous problems have remained unsolved, however, and continue to place voice activated systems beyond the financial reach of the general marketplace. For example, the typical level of confidence in voice recognition for commercial software is between 45 to 60%. At this rate, the system is averaging only one out of two words with correct identification. This is hardly adequate for general application. This confidence level is even less when environmental factors are introduced such as background noise, mobility of the user and other unpredictable variables that modify the audio signal being received at the computer.

In typical applications for voice activated systems, one might expect a telephone to ring during dictation, an interruption to occur by another voice having a different voice pattern, the sounding of a horn, clock alarm, or any of thousands of extraneous background noises. Even the shifting of position of the speaking individual can modify the audio signal enough to confuse the computer recognition of sounds. The speaker may simply turn her head to a different direction and create enough variation to thwart voice recognition.

Resolution of these anomalies must be accomplished before voice command systems can be of general use. Current efforts have focused on generation of complex algorithms which sift through the maze of audio signal and attempt to classify and discard background noise. Obviously, it is impossible to completely predict and program every potential superfluous signal that may eventually be detected. Voice variations by the user are even more challenging, because the occurrence of a cold, sinus problems, and variations in voice orientation to the microphone are extremely difficult to classify or quantify. As a consequence, voice command systems are marginal in overall performance and are extremely expensive.

Undoubtedly, part of the problem of voice recognition arises because of the use of conventional microphones as the media for processing voice signals. Voice recognition obviously requires conversion of the audio input to digital or analog signal. Generally, a digital conversion is necessary before comparison with database information is possible. A normal microphone will pick up sounds indiscriminately, thereby adding in background noise which is a primary source of confusion.

Although some discrimination of sound can be accomplished by frequency filters, proximity attenuators, and related devices that group sound characteristics as to common features of frequency or volume, total isolation of desired sounds has not generally been accomplished when the speaker is in a nonisolated environment. Development of such a selective microphone system has long been needed and would provide great advantage in countless applications. This is so with any form of telephone system that is hands free so that the microphone is picking up background signal along with the primary speaker's voice. Visor microphones for cellular car phones is just one of a myriad of examples. TV and stage cameramen, as well as other sound technicians who must communicate quietly while recording or producing video and sound works, require constant communication which functions best in an isolated mode. Switchboard operators, pilots, motorcyclists, workers having on line communication systems in high-noise environments—all need a communication system which isolates the voice signal from all extraneous sounds.

U.S. Pat. No. 4,588,867 by Konomi addressed some of these problems and disclosed the possible utility of an ear-mounted microphone for discarding air-borne sound waves in favor of bone conduction of the speaker's voice. Aside from technical problems which may have affected the inability of this device to perform adequately, practical considerations also limit the general acceptance of such ear-mounted microphone systems. For example, the Konomi device places a microphone element deep in the ear canal in order for vibrations to be accessed from the bone. This requirement immediately imposes the high cost of having the canal insert portion sized to the unique configuration of the user's ear canal as with a hearing aid. It also adds the discomfort of having an insert in the ear, creating an unnatural and unacceptable sensation which would undoubtedly preclude universal usage of the device.

As a further problem, the Konomi reference may be subject to audio feedback arising from the close proximity of the microphone element and speaker, where a duplex mode is selected. Needless to say, the challenge of an acceptable ear-mounted microphone was not resolved with Konomi.

U.S. Pat. No. 4,930,156 by Norris addressed the problem of audio feedback with its disclosure of an ear microphone/speaker combination; however, the microphone was placed outside the ear and was sensitive to ambient noise. The absence of isolation of the speaker voice gave the device only limited acceptance, despite the fact that it offered some improvement over the prior art.

What is needed therefore is a microphone that totally isolates the voice of the speaker from the environment, yet which is not limited by sizing for the ear canal or does not create discomfort by being fit within the ear canal.

OBJECTS AND SUMMARY OF THE INVENTION

It is an object of the present invention to provide an ear-mounted microphone which is capable of isolating the voice of the speaker from all extraneous, background noise.

It is a further object of the present invention to provide an ear mounted microphone which does not require entry of any physical structure within the ear canal yet still isolates the voice of the speaker from all outside noises.

Yet another object of the present invention is to provide for an ear mounted microphone which includes a speaker in direct proximity with the microphone for enabling duplex operation in a speak and listen mode.

A still further object of the present invention is to provide a microphone/speaker device which is mounted at the ear and which enables hands free, duplex communication without feedback.

Another object of the present invention is to provide an ear mounted microphone capable of providing audio input to a computer or modem to facilitate voice recognition for direct voice command to compute controls.

Another object of the present invention is to provide a microphone/speaker combination which can be interconnected with a telephone system to provide hands free speak and listen capabilities in duplex mode.

Yet another object of this invention is to enable voice pickup via an ear mounted microphone which can be coupled into a telemetry unit for wireless communication with a modem, computer or other receiver device capable of accepting radio frequency signal.

These and other objects are realized in an ear piece device configured to be supported at the ear of a user which provides a microphone sensitive only to sounds conducted within the skull of the user, and isolating such sounds from background noise and environment. This device includes a housing which is configured at one end to fit snugly at the ear canal of the user but not to extend within the ear canal with its physical structure. This device includes means for passing sound waves into the housing which is made of sound conductive material. A microphone element is coupled within the housing in a position which is not placed substantially within the ear canal of the user during operation. This microphone includes an inertial platform which has sufficient mass to substantially resist movement associated with the housing by reason of audio vibration and which is cantilevered at one end within the housing and signal means for generating a signal representing vibrations transferred into the platform associated with the audio vibrations in the housing. This microphone element may also be configured as a support arm with a relatively larger inertial platform suspended at one end of the support arm for enhancing resistance to movement at increasing audio vibration. The signal means is coupled to electrical circuitry for converting relative movement of the inertial platform with respect to the housing into audio signal suitable for processing in an audio circuit. This device may also include a speaker element which is positioned at an end of the housing adjacent the ear canal for providing duplex operation.

The present invention includes a method isolating an individual speech for reproduction from the environment or background noise associated with the individual wherein the method comprises the steps of:

positioning a housing device in contact with a portion of the individual's skull outside an ear canal such that vibrations arising within the skull from voice communications of the individual are transmitted into the housing;

suspending a cantilevered inertial platform as part of a microphone element inside the housing but in a position which is not placed substantially within the ear canal of the user during operation;

gathering sound vibrations from the skull into the housing;

detecting the sound vibrations within the housing by measuring movement with respect to an inertial platform contained within and cantilevered from the housing;

producing an electric signal corresponding to the detected sound vibrations with respect to the inertial platform; and converting the electrical signal to audio signal.

The use of a piezoelectric crystal is disclosed as a suitable platform.

Other objects and features of the present invention will be apparent to those skilled in the art, taken in combination with the accompanying drawings.

DETAILED DESCRIPTION OF THE INVENTION

Figure 1:
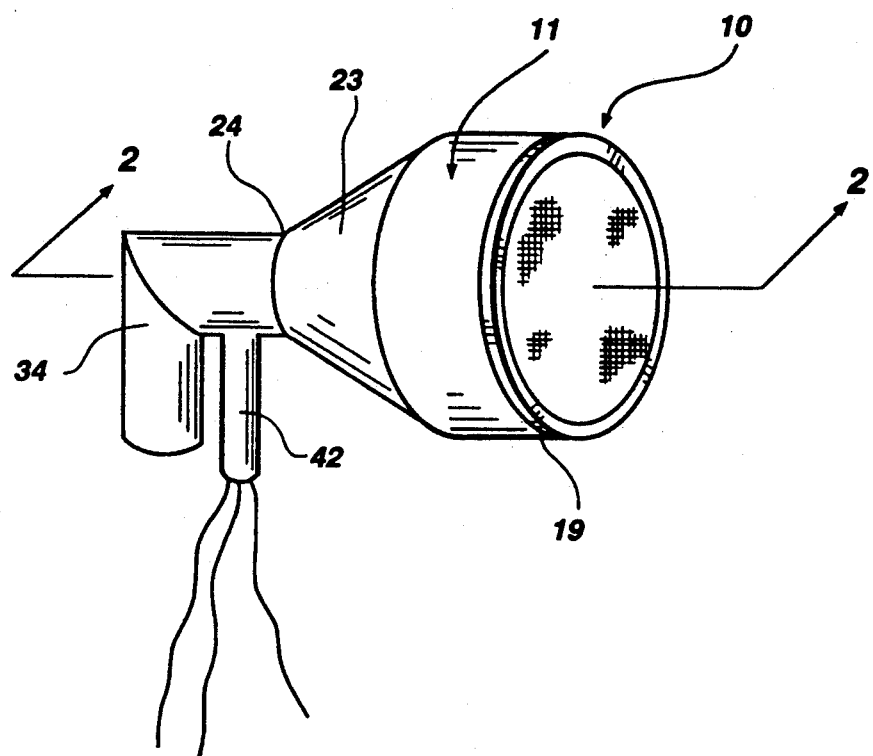
FIG. 1 shows a perspective, elevational view of an ear device including a speaker element and microphone element.

Referring now to the drawings:

The ear piece 10 of the present invention includes a surrounding housing 11 which forms a cavity 12 capable of housing a speaker element 13 with its directional orientation 14 positioned toward the ear canal 15 (FIG. 4) when positioned at the user's ear 16. The housing 11 and a contained microphone element 17 is sensitive only to sound vibrations conducted within the skull 18 of the user.

The housing 11 is configured at one end 19 to fit snugly at the ear canal 15 by frictional contact with surrounding ear tissue 20 and 21. It is significant that the housing and its attached structure does not extend into the ear canal 15 and therefore does not impose any discomfort or unique fitting requirements required for use of this device. The housing is constructed of material which is sound conductive, providing means for passing sound waves from the skull 18 and surrounding tissue into the housing 11.

In the preferred embodiment, the housing has a tapering configuration 23 which functions to concentrate or focus the vibrational energy arising from contact of the housing 19 with the user's ear 16. This tapering body 13 operates as an acoustical lens which amplifies the sound vibrations at a convergence 24 of the housing. This acoustical lens configuration includes a small structural element 25 which has a cross section configured as a I-beam. One side 26 of this I-beam is coupled at the housing convergence 24 at its face so that the focused vibrational energy channeled from the housing is collected at the I-beam structure to develop maximum relative movement with respect to an attached inertial platform which operates as the microphone element 17. This microphone element 17 attaches to the other face 28 of the I-beam structure, providing a transfer medium for receiving the sound vibrations from the housing.

The microphone element is thereby coupled to the housing in a position such that the microphone element is separated from contact with the skull by the housing. This microphone element includes an inertial platform 30 which has sufficient inertial mass to substantially resist movement associated with the housing by reason of audio vibrations. The meaning of inertial mass in this instance is not limited to the typical association calculation of mass from Newton's Second Law, but generally refers to sufficient mass such that the inertia of this body resists immediate movement as the housing to which it is connected vibrates. Instead, because of the inertia or resistance to movement in the inertial platform, stress is imposed within the platform 30 and its attached support structure 31 which forms a support arm providing means of detecting the audio vibration which has been channeled into the housing to which the inertial platform of relatively larger size is coupled. By selecting a piezoelectric crystal as the inertial platform/support structure, the stress developed can be detected as a variable electric signal, which can be processed to generate audio output corresponding to the vibrations transferred from the housing into the inertial platform.

Figure 2:
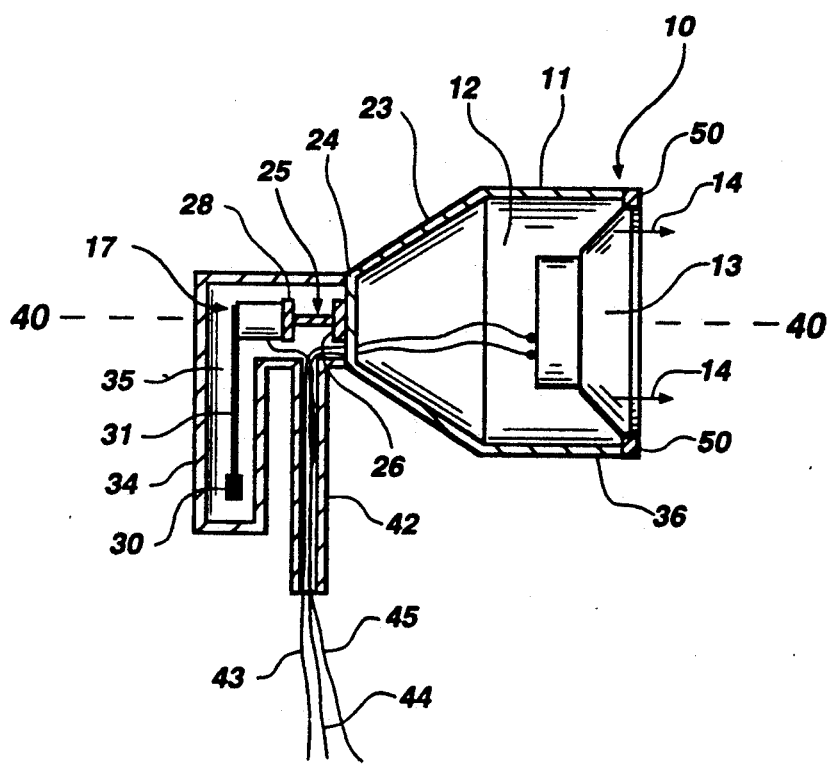
FIG. 2 discloses a cross section across the housing of the device shown in FIG. 1, taken along the lines 2—2.

Typically, the inertial platform is cantilevered at one end of the support arm which is mounted within an end portion 34 of the housing which contains the microphone element. The piezoelectric crystal constitutes a form of signal means which is capable of generating electric output corresponding to the vibrational energy. This signal means or crystal is coupled via a contact lead 35 to electrical circuitry for converting relative movement of the inertial platform with respect to the housing into an audio signal suitable for processing in an audio circuit. Hereagain, it is important to note that the inertial platform 30 is suspended at a distal end of the support arm and inside the housing 11/34 and is not in a position which is placed within the ear canal 15. Therefore, we have the unexpected structural relationship in which the microphone element 17 is positioned at an opposite end of the housing 11 from the speaker end 36 which is in actual contact with the ear and skull of the user. This configuration is selected despite the fact that the microphone pickup will actually be isolated with respect to vibrational energy arising from the skull based on voice communication of the user. The positioning of the inertial platform at an opposing end of the housing 34 from that portion of the housing 36 which is configured to fit snugly at the ear canal provides several unexpected advantages, despite the fact that it would appear to be more logical to couple the microphone element as close the vibrating skull structure as possible. As viewed in FIG. 2, the right side of the device as oriented with respect to the elongate axis 40 provides the housing for the speaker element 13, as well as the snug fit or frictional contact structure 36 for placement at the ear canal. The left side of the ear device as viewed with respect to the elongate axis 40. With respect to configuration in FIG. 4, this elongate axis 40 would be oriented directionally toward the ear canal 15 when in position for use.

The placement orientation for the inertial platform or microphone element 17 is generally at right angles to the elongate axis 40 to maximize the relative movement of the inertial platform in response to sound vibrations transmitted into the housing 11 along this elongate axis 40. Assuming that the vibration has its strongest directional component along the axis 40, placement of the inertial platform at right angles will generate maximum displacement and attendant stress within the platform structure. This, consequently, optimizes signal strength generated by the piezoelectric crystal, which is directly proportional to the stress arising within the crystal structure from vibrational energy traveling in the direction of the axis 40. In view of this construction, the end portion 34 of the housing likewise is constructed at right angles with respect to the remaining housing structure 11.

It will be noted that a second housing portion 42 is provided and operates as a conduit for exiting wire 43, 44 and 45. Wire 43 represents the exterior portion of lead 35 which extends from the microphone element. Wires 44 and 45 are contacts which couple with the speaker element 13.

To enable duplex operation of both speaker and microphone in the same housing, it is necessary to acoustically isolate the speaker element 13 from the casing. In the present invention, this is accomplished by tuning the insulation means 50 similar to operation of a band pass filter within radio circuitry. Specifically, the speaker element 13 is mounted to the end housing 36 through a nonvibrational ring 50 which extends around the speaker element and operates to isolate the housing as sound insulation means from the speaker element. This helps to prevent sound vibration transmission through the housing and into the microphone element, which might otherwise lead to irritating feedback.

This problem becomes significant in duplex operation because of the close proximity of the speaker element 13 and microphone element 17. In such close proximity, vibration associated with the speaker element would normally be transferred into the housing and immediately fed into the microphone element 17. In a duplex telephone system where side tone is present, signal from the microphone element 17 is fed back into the speaker 13 to facilitate the user hearing his own voice as reproduced. Failure to acoustically isolate the speaker results in vibrational energy transferred into the housing which represents the speaker's voice being recirculated in a loop. This results in the common occurrence referred to as feedback, which becomes most annoying. This insulating ring 50 is comprised of materials specifically selected or tuned to a particular frequency range that is substantially below the frequencies that will be passed on the speaker, thereby isolating the speaker acoustically. Placement of the speaker at the front end 36 of the housing provides a large area which enables the use of a large acoustical filter ring 50. Suitable materials which may be applied to tune the insulation ring 50 to a particular frequency range generally include silicone but may be comprised of other materials which can demonstrate an ability to absorb vibrational energy and block its passage from entering the housing 11. Such material can also be applied at the rearward portion 24 of the housing 11 where the respective fine speaker wires 44 and 45 pass through the housing and out the conduit 42. With both the speaker and the attached wiring insulated, the speaker vibrations are isolated and duplex operation is facilitated without feedback.

Figure 3:
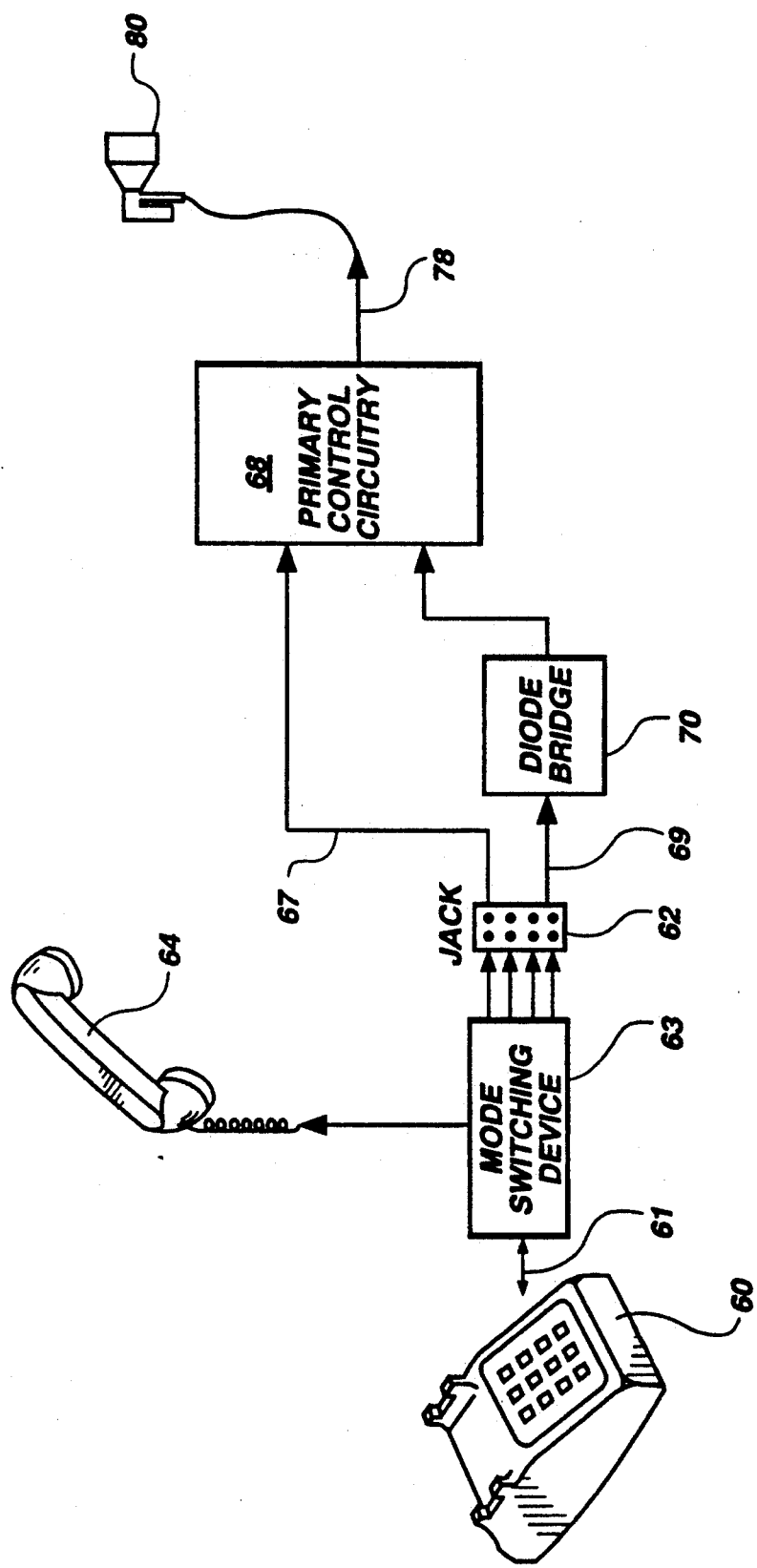
FIG. 3 shows a schematic layout of the ear piece device in combination with a telephone circuit.

FIG. 3 illustrates a basic telephone unit and casement 60 which are coupled into a telephone standard jack for connection to a communication network. The present ear piece device as shown in item 80 provides a microphone and speaker signal which will be processed and transmitted through conventional wirings 61 coupled to the telephone unit 60. Universal coupling configurations to adapt the present system to a standard, four lead telephone wire are disclosed in U.S. Pat. No. 4,930,156 and represented in FIG. 3. Additional explanation of this system may be obtained by reference to this U.S. patent.

Figure 4:
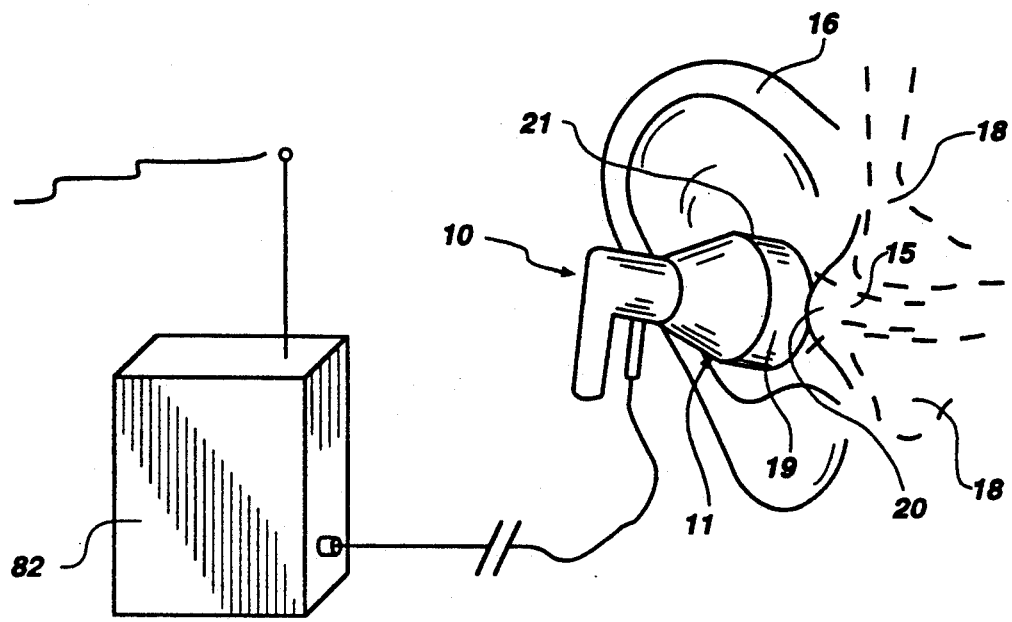
FIG. 4 illustrates the use of the present ear piece device with a telemetry system, enabling isolated voice communication.

The present invention can be coupled into this standard phone system by use of a mode switching device 63. This is accomplished by a toggle switch wherein one position transfers the signal directly to the handset 64 as if the control circuitry and ear piece of the present invention were not attached. When switched to a secondary position, the signal is transferred into an interconnect jack 62 which operates as described in the referenced U.S. patent. One output line 67 carries speaker signal and feeds to the primary control circuitry 68 which includes speaker amplifier, mike preamplifier and phasing control. The second output line 69 carries microphone signals through a diode bridge 70 and into the primary control circuitry 68. Both microphone and speaker signals are transmitted along a four wire connection 78 to the ear mounted speaker/microphone combination 80 as disclosed in this invention and represented in FIGS. 1 and 2. It will also be apparent that the interconnect lead 78 could be serviced by a radio frequency transmitter/receiver which could provide a wireless mode to this duplex telephone system. Similarly, the present system can be wired to a belt transmitter 82 as shown in FIG. 4. In this system, the ear device with either a microphone or microphone/speaker combination can be wired from the ear to the belt transmitter 82 to facilitate convenient operation without the extra weight of a transmitter unit positioned within the housing 11. The embodiment represented in FIG. 4 is particularly useful with respect to transmission of voice commands to computer systems which are capable of voice recognition. This arises because of the isolated content of the voice reproduction. In a microphone mode, the present device receives vibrational energy only from the skull or head of the user. This vibrational energy is transmitted into the housing 11 and goes through associated communication link, such as the art of transmitting device 82. On the other hand, no ambient noise such as distracting telephone rings or interruptions from third parties are received into the microphone because they do not become part of the vibrational energy within the casement or housing 11. Similarly, the rotation of the user's head has no impact upon the quality of voice transmission because of the reliance on vibrational energy from the skull. In view of this method of isolating the voice of the speaker from the environment, the present ear mounted microphone enables greatly simplified algorithms for implementing voice recognition. In essence, the voice of the speaker is generally the same and can be used to train the algorithm and computer to reproduce corresponding commands associated with the acoustic vibration sent into the housing 11.

When the present invention was substituted within a conventional voice recognition system which previously yielded confidence levels of 45 to 60 percent, voice recognition was improved to the average of 92 to 100 percent. This remarkable improvement based on use of the present microphone element as disclosed and claimed in this application opens the door to a new era of voice command for computer systems generally.

Figure 5:
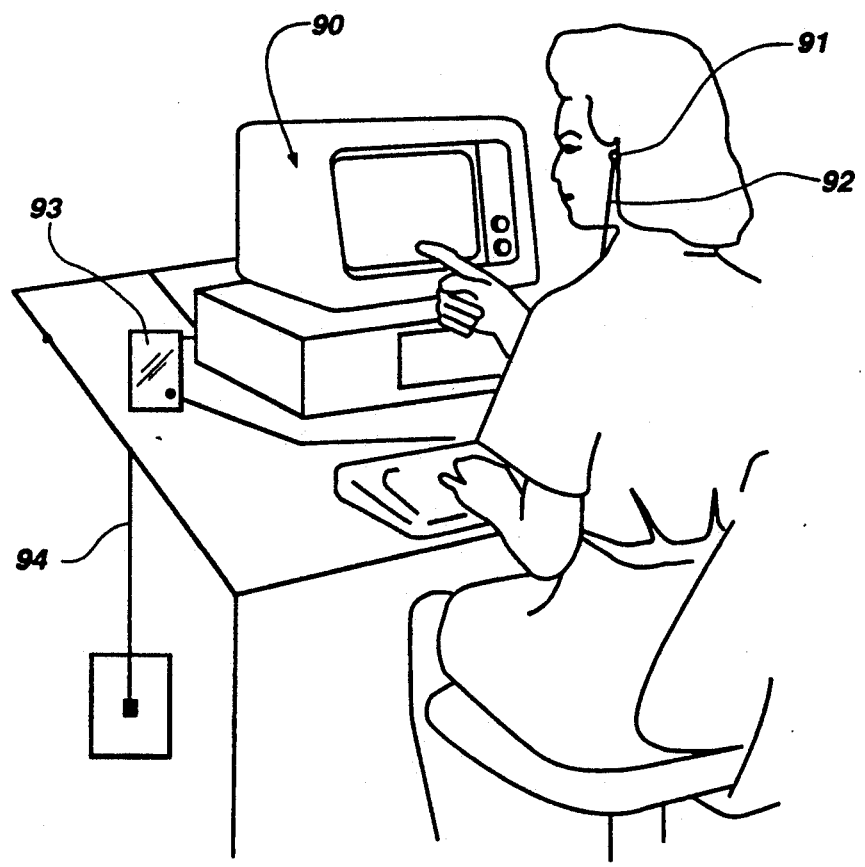
FIG. 5 graphically illustrates the use of the present ear piece device in combination with a computer and modem, enabling voice recognition and voice command.

For example, FIG. 5 illustrates the use of voice command with a computer 90 which includes software capable of voice recognition. Voice commands are supplied through the ear microphone 91 of the present invention, which is wired 92 into a control circuit 93 which amplifies and supplies appropriate signal into a computer modem (not shown) at the back of the computer. Voice command is now enabled and the user may directly state the desired action verbally, to which the computer can immediately respond. Additional voice communication is enabled by the user through a coupled phone line 94 which enables concurrent voice communication with third parties. Based on this system, the user may discuss in conference call various issues arising with respect to preparation of documents or other matters facilitated by computation of a computer system and may immediately give voice command to the computer to implement and perform desired operations. This is all accomplished in "hands-free mode" without concern for environmental noises associated with the operator's station. The system can even be made mobile for intercommunications while the operator moves about an office building where the office building has been configured with a microcell communication system. In this instance, the telemetry system as shown in FIG. 4 would be used by the operator, who would move from section to section, communicating directly with common frequencies which tie the various microcells into a single network of communication. In this case, the operator can give verbal commands to computer to take care of certain operations, may communicate directly with other individuals within the microcell and can generally perform multiple duties by mere voice command. In addition, the user can direct a computer to place a phone call to a third party outside the microcell and can establish direct phone line communication with this party via the duplex mode within the ear piece 10. Such a system gives total flexibility to the operator who may be mobile and operating with hands free to accomplish multiple tasks and communicate with multiple parties.

These various benefits and improvements are provided in a method for isolating an individual's speech for reproduction from an environment of background noises, generally represented by the following steps.

First, the user positions a housing device in contact with a portion of his skull or ear, but outside the ear canal such that vibrations arising from voice communications are transmitted into the housing. This housing then gathers sound vibrations from the skull and enables the next step of detecting the sound vibrations within the housing by measuring movement with respect to an inertial platform. This inertial platform is contained within the housing and is cantilevered to provide a base for measurement of relative motion. The next step involves producing an electric signal corresponding to the detected sound vibrations with respect to this inertial platform. Finally, this electric signal is converted into audio signal, which represents the isolated voice communication of the user. The preferred embodiment involves the step of positioning an elongate piezoelectric crystal illustrated in FIG. 7 within the housing as the inertial platform. Such devices produce an electric signal when response to stress applied and can provide a voltage which enables detection and measurement of vibrational movement of the housing. This signal can be processed through an audio circuit to reproduce the voice speech of the user. The method can be further extended by coupling a speaker element at one end of the housing next to the ear canal and acoustically isolating this speaker element from the attached housing by positioning an intermediate vibrationally nonconductive barrier operable over a selective range of sound vibration. This operates to preclude transmission of sound which might otherwise lead to acoustic feedback.

Figure 6:
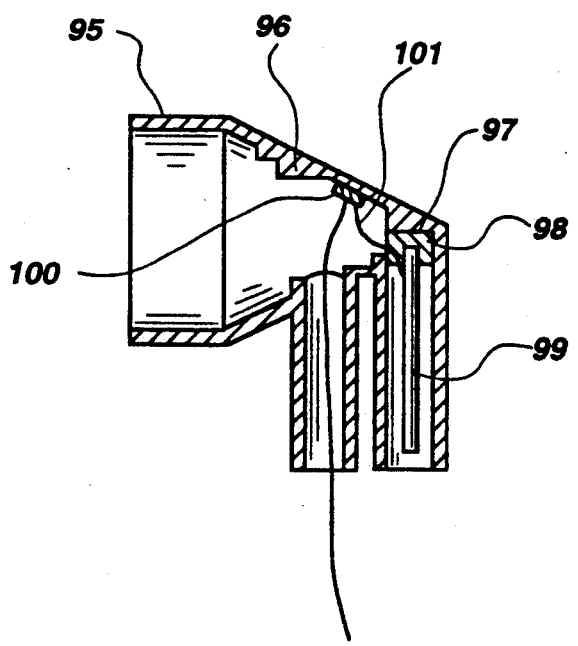
FIG. 6 shows a preferred embodiment of the present invention, comprising a microphone only.
Figure 7:
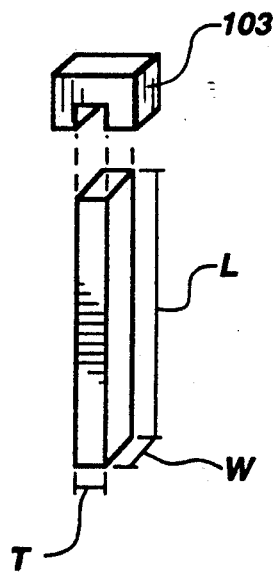
FIG. 7 illustrates an inertial platform constructed of piezoelectric crystals.

FIGS. 6 and 7 disclose an embodiment wherein a microphone is provided within the housing 95, but without a speaker element. As before, the housing is tapered to provide an acoustical lens 96 which focuses sound vibration into the microphone element 97. This microphone element includes a rubber insert 98 and attached piezoelectric crystal 99 which operates as the inertial platform. Electric signals generated at the crystal 99 is transferred to an FET 100 over connecting lead 101. Although dimensions for the inertial platform will generally be experimentally developed, representative dimensions for a piezoelectric element as shown in FIG. 7 are as follows. The length L of the crystal is approximately ½ inch. The width W is approximately 0.08 inches. The thickness T is approximately 0.021 inches. These dimensions provide appropriate mass and configuration to generate stress capable of supplying a clear signal which enables audio reproduction through this microphone system.

Although preferred embodiments and specific examples have been disclosed, it is to be understood by those skilled in the art that the scope of the invention is to be determined only by the following claims.

I claim:

1. An ear piece device configured for being supported at the ear and providing a microphone which is sensitive only to sounds conducted within the skull of the user, said ear piece including:
   a housing which is configured at one end to fit snugly at the ear canal of the user but not extend into the ear canal, and includes means for passing sound waves into the housing, said housing being constructed of material which is sound conductive;
   a microphone element coupled within the housing;
   said microphone element including an inertial platform having sufficient inertial means to substantially resist movement associated with the housing by reason of audio vibration and which is cantilevered at one end within the housing and includes signal means for generating a signal representing vibrations transferred into the platform associated with the audio vibrations in the housing, wherein the inertial platform is suspended inside the housing but in a position which is not placed within the ear canal of the user during operation;
   said signal means being coupled to electrical circuitry for converting relative movement of the inertial platform with respect to the housing into audio signal suitable for processing in an audio circuit.

2. A device as defined in claim 1, wherein the inertial platform is positioned at an opposing end of the housing from that portion of the housing which is configured to fit snugly at the ear canal.

3. A device as defined in claim 2, further comprising a speaker element positioned at an end of the housing adjacent the ear canal, said microphone element being positioned at the opposing end of the housing.

4. A device as defined in claim 3, wherein the housing includes an opening oriented toward the ear canal when in position, said opening including the speaker element being positioned thereat for direct exposure to the ear canal to enable the user to receive audio transmissions as well as send audio signal through the microphone element, said audio transmission and attendant vibration of the speaker element being isolated from the housing by sound insulation means to prevent pick up of the transmission through the housing and into the microphone element.

5. A device as defined in claim 4, wherein the isolation means comprises a nonvibrational ring extending around the speaker element and being coupled between the housing and perimeter of the speaker element to prevent transmission of vibration into the housing.

6. A device as defined in claim 5, further including means for isolating from the housing any vibration carried by connecting wires which supply power to the speaker element.

7. A device as defined in claim 5, said isolating means comprising a material which selectively limits passage of vibration for frequencies which could give rise to feed back between the speaker and microphone elements which are contained within the housing.

8. A device as defined in claim 3, wherein the housing portion which contains the speaker element includes a truncated conical section which tapers to a juncture with an acoustical lens configured to receive amplified speech vibrational energy applied to the housing from the skull of the user.

9. A device as defined in claim 8, wherein the acoustical lens comprises a small structural element having a cross-section configured as an I-beam, said housing being coupled to a face at one side of the 1-beam and said inertial platform being extended from the face at the other side of the I-beam, said I-beam thereby being operable to focus vibrations collected from the housing into the small I-beam structure for maximum relative movement with respect to the inertial platform.

10. A device as defined in claim 9, wherein the housing includes a rearward portion which extends at right angles with respect to the remaining portion of the housing, said rearward portion containing the inertial platform extending from the acoustical lens.

11. A device as defined in claim 10, further comprising a second housing portion extending at right angles from the remaining housing, said second housing portion comprising a conduit for carrying associated wiring from the microphone and speaker elements to an exterior portion of the device.

12. A device as defined in claim 3, further comprising a radio frequency transmitter/receiver unit coupled to the microphone element and speaker element respectively, thereby enabling the use of the ear piece device as part of a wireless system of communication.

13. A device as defined in claim 12, further comprising associated communication and transfer circuitry tuned to a common frequency with the transmitter/receiver unit, thereby enabling use of the ear piece device as part of a microcell communication system, said ear piece device providing direct communication into respective microcell communications satellite receiving and transmitting stations.

14. A device as defined in claim 3, further comprising telephone control circuitry coupled to the speaker element and microphone element, said telephone control circuitry providing access for the speaker element and microphone element as part of a telephone system which provides hands-free use based on both speaking and listening functions being provided through the user's ear.

15. A device as defined in claim 3, further including connecting means for coupling the microphone element to a modem associated with a computer, said connecting means enabling direct audio transmission into the modem without outside audio signal other than the voice of the user.

16. A device as defined in claim 3, further comprising a sizing ring coupled to the housing, including means for modifying the diameter of the housing which is snugly fit at the ear canal.

17. A device as defined in claim 1, wherein the housing is configured with a tapering body to provide an acoustical lens which amplifies the sound vibrations received from the skull at a convergence of the housing.

18. A device as claimed in claim 17, wherein the acoustical lens includes a small structural element having a cross-section configured as an I-beam, said housing convergence being coupled to a face at one side of the I-beam and said inertial platform being extended from the face at the other side of the I-beam, said I-beam thereby being operable to focus vibrations collected from the housing into the small I-beam structure for maximum relative movement with respect to the inertial platform.

19. A device as defined in claim 1, wherein the inertial platform comprises an elongate piezoelectric crystal which is coupled at an end to the housing, said crystal being configured to enable displacement without substantial movement of the piezoelectric crystal, thereby imposing stress at the crystal to generate electrical output for development of the signal for audio processing.

20. A device as defined in claim 1, wherein the housing includes an elongate axis which is oriented along the portion of the housing which is supported at the ear canal, said axis being directionally oriented toward the ear canal when the housing is in position for use;

said inertial platform being suspended at right angles to the elongate axis to develop relative movement in response to sound vibrations transmitted into the housing along the elongate axis.

21. A device as in claim 1, further comprising a sizing ring positioned around the speaker end of the housing for adjusting housing size for snug fit at the ear canal.

22. An ear piece device for use in a communication system, said device comprising:
a housing having a speaker end and a microphone end, said speaker end being configured for a snug fit at the ear canal of a user without including structure which substantially enters the ear canal during operation;
a speaker element mounted with sound projection oriented toward the user's ear canal and including isolation means coupled between the speaker element and the housing for selectively isolating undesirable frequencies that might interfere with sensitivity of audio pick up at the microphone end of the housing;
a microphone element mounted at the microphone end of the housing, said microphone element being coupled to an acoustical lens which is attached between the speaker end and microphone end of the housing;
said acoustical lens comprising a small vibration-sensitive element which is coupled between the speaker end and the microphone end of the housing such that audio vibrations received from the skull of the user are transmitted through the housing and into the acoustical lens;
the other end of the acoustical lens including an attached inertial platform which includes means for converting relative physical vibrations actuated by sound waves received from the user's skull into an electric signal capable of audio processing for reproduction.

23. A device as defined in claim 22, wherein the isolation means comprises a nonvibrational ring extending around the speaker element and being coupled between the housing and perimeter of the speaker element, said ring being formed of material which is selective as to a range of frequencies which will be decoupled as compared to those which will be transmitted, to prevent transmission of interfering vibration into the housing.

24. A device as defined in claim 23, wherein the isolation means comprises a material which is tuned to acoustically isolate the housing from the speaker element to prevent feedback.

25. A device as defined in claim 24, wherein the material includes silicone.

26. A device as defined in claim 22, wherein the inertial platform comprises a piezoelectric crystal which is capable of detecting differences in stress arising because of vibration of the housing as a consequence of voice vibrations conducted through the user's skull.

27. A device as defined in claim 22, wherein the acoustical lens comprises a small structural element having a cross-section configured as an I-beam, said housing being coupled to a face at one side of the I-beam and said inertial platform being extended from the face at the other side of the I-beam, said I-beam thereby being operable to focus vibrations collected from the housing into the small I-beam structure for maximum relative movement with respect to the inertial platform.

28. A device as in claim 22, further comprising a sizing ring positioned around the speaker end of the housing for adjusting housing size for snug fit at the ear canal.

29. A method for isolating an individual's speech for reproduction from an environment of background noise which is not be detected, said method comprising the steps of:
a) positioning a housing device in contact with a portion of the individual's skull but outside an ear canal such that vibrations arising within the skull from voice communications of the individual are transmitted into the housing;
b) gathering sound vibrations from the skull into the housing;
c) suspending a cantilevered inertial platform as part of a microphone element inside the housing but in a position which is not placed substantially within the ear canal of the user during operation;

d) detecting the sound vibrations within the housing by measuring movement with respect to the inertial platform contained within and cantilevered from the housing;

e) producing an electric signal corresponding to the detected sound vibrations with respect to the inertial platform; and f) converting the electric signal to audio signal.

30. A method as defined in claim 29, further comprising the steps suspending one end of an elongate piezoelectric crystal within the housing as the inertial platform and producing the electric signal based on voltage generated by the crystal in response to changes in stress applied to the crystal by reason of vibrational movement of the housing.

31. A method as defined in claim 29, further comprising the steps of coupling a speaker element at one end of the housing next to the ear canal and acoustically isolating the speaker element from the attached housing by positioning an intermediate vibrationally nonconductive barrier operable over a selective range of sound vibration which is to be precluded from transmission to the housing.

32. An ear piece device configured for being supported at the ear and providing a microphone which is sensitive only to sounds conducted within the skull of the user, said ear piece including:

a housing which is configured at one end to fit snugly at the ear canal of the user but not extend substantially into the ear canal, and includes means for passing sound waves into the housing, said housing being constructed of material which is sound conductive;

a microphone element coupled within the housing, said microphone element including a support arm and a relatively larger inertial platform suspended at one end of the support arm, said inertial platform having sufficient inertial mass to substantially resist movement associated with the housing by reason of audio vibration, said support arm being cantilevered at a remaining end within the housing and including signal means for generating a signal representing vibrations transferred into the platform associated with the audio vibrations in the housing;

said signal means being coupled to electrical circuitry for converting relative movement of the inertial platform with respect to the housing into audio signal suitable for processing in an audio circuit.

33. A device as defined in claim 32, wherein the inertial platform is suspended inside the housing but in a position which is not placed within the ear canal of the user during operation.

34. A device as defined in claim 33, wherein the inertial platform is positioned at an opposing end of the housing from that portion of the housing which is configured to fit snugly at the ear canal.

35. A device as defined in claim 32, further comprising a speaker element positioned at an end of the housing adjacent the ear canal, said microphone element being positioned at the remaining end of the housing.

36. A device as defined in claim 35, wherein the housing portion which contains the speaker element includes a truncated conical section which tapers to a juncture with an acoustical lens configured to receive amplified speech vibrational energy applied to the housing from the skull of the user.

37. A device as defined in claim 32, wherein the inertial platform comprises an elongate piezoelectric crystal which is coupled at an end to the housing, said crystal being configured to enable displacement without substantial movement of the piezoelectric crystal, thereby imposing stress at the crystal to generate electrical output for development of the signal for audio processing.

38. A device as defined in claim 32, wherein the housing is configured with a tapering body to provide an acoustical lens which amplifies the sound vibrations received from the skull at a convergence of the housing.

* * * * *